(12) United States Patent
Jiang et al.

(10) Patent No.: US 12,139,859 B2
(45) Date of Patent: Nov. 12, 2024

(54) METHOD AND SYSTEM FOR DETECTING ROAD INTELLIGENT COMPACTION INDEX

(71) Applicant: Sichuan Road and Bridge Construction Group Co., Ltd., Sichuan (CN)

(72) Inventors: Shuangquan Jiang, Sichuan (CN); Wei Lu, Sichuan (CN); Yuan Ma, Sichuan (CN); Jianglin Du, Sichuan (CN); Tao Ma, Sichuan (CN); Yanping Luo, Sichuan (CN); Wanchun Liu, Sichuan (CN); Mingkai Zhou, Sichuan (CN); Maoqin Niu, Sichuan (CN)

(73) Assignee: Sichuan Road and Bridge Construction Group Co., Ltd., Sichuan (CN)

( * ) Notice: Subject to any disclaimer, the term of this patent is extended or adjusted under 35 U.S.C. 154(b) by 0 days.

(21) Appl. No.: 18/627,419

(22) Filed: Apr. 4, 2024

(65) Prior Publication Data
US 2024/0337077 A1 Oct. 10, 2024

(30) Foreign Application Priority Data
Apr. 4, 2023 (CN) .......................... 202310348728.2

(51) Int. Cl.
*E01C 19/22* (2006.01)
*E01C 19/28* (2006.01)

(52) U.S. Cl.
CPC ................... *E01C 19/288* (2013.01)

(58) Field of Classification Search
CPC .................................... E01C 19/288
See application file for complete search history.

(56) References Cited

U.S. PATENT DOCUMENTS

| | | | |
|---|---|---|---|
| 5,727,900 A * | 3/1998 | Sandstrom | G01P 15/18 |
| | | | 702/56 |
| 6,431,790 B1 * | 8/2002 | Anderegg | E01C 19/288 |
| | | | 73/594 |

(Continued)

FOREIGN PATENT DOCUMENTS

| CN | 108647661 A | 10/2018 |
|---|---|---|
| CN | 110136739 A | 8/2019 |

(Continued)

OTHER PUBLICATIONS

Yuan Ma et al, Intelligent Compaction: An Improved Quality Monitoring and Control of Asphalt Pavement Construction Technology. IEEE Transactions on Intelligent Transportation Systems. vol. 23, issue 9. Dec. 24, 2021. 14875-14882.

(Continued)

*Primary Examiner* — Gary S Hartmann
(74) *Attorney, Agent, or Firm* — THE SUN IP LAW

(57) ABSTRACT

A method and system for detecting road intelligent compaction index, so as to solve the problem of inaccurate use of a road intelligent compaction index due to the fact that existing harmonic ratio indexes do not consider the influence of a non-integral period on the accuracy and also do not consider a higher harmonic. According to the disclosure, a relative relationship between amplitudes of the higher harmonic and a fundamental wave in an acceleration time domain signal is considered based on the related art, the amplitude of the higher harmonic is introduced into a main body road intelligent compaction index of an road intelligent compaction index, and a precondition for the use of the road intelligent compaction index of the main body is established, that is, a machine-material decoupling control the machine-material decoupling control index.

6 Claims, 4 Drawing Sheets

(56) References Cited

U.S. PATENT DOCUMENTS

| | | | | |
|---|---|---|---|---|
| 8,142,103 | B2* | 3/2012 | Wolf | E01C 19/288 404/117 |
| 8,162,564 | B2* | 4/2012 | Potts | E01C 19/288 404/84.1 |
| 8,635,903 | B2* | 1/2014 | Oetken | E02D 3/046 73/78 |
| 2021/0172128 | A1* | 6/2021 | Marx | E01C 19/288 |
| 2022/0136184 | A1* | 5/2022 | Mühlhausen | E01C 19/286 404/122 |
| 2023/0020213 | A1* | 1/2023 | Commuri | E01C 19/288 |
| 2023/0023128 | A1* | 1/2023 | White | G01N 33/42 |

FOREIGN PATENT DOCUMENTS

| | | |
|---|---|---|
| CN | 112267357 A | 1/2021 |
| CN | 112942294 A | 6/2021 |
| CN | 113358742 A | 9/2021 |
| CN | 113567553 A | 10/2021 |
| CN | 114004041 A | 2/2022 |
| CN | 115034697 A | 9/2022 |
| JP | 2023016137 A | 2/2023 |

OTHER PUBLICATIONS

Jia, Tong. "Research on Key Technologies of Intelligent Compaction System for Asphalt Pavement", China Doctoral Dissertation full text Database Engineering Science and Technology II series. Feb. 15, 2022. C034-22.

Yang, Tiantian. "Research on In-cylinder combustion State Monitoring of Diesel Engine based on time-frequency Analysis of Vibration Signals," China Doctoral Dissertation Full text Database Engineering Science and Technology II series. Aug. 15, 2019. C039-14.

* cited by examiner

METHOD AND SYSTEM FOR DETECTING ROAD INTELLIGENT COMPACTION INDEX

CROSS-REFERENCE TO RELATED APPLICATION

The present disclosure claims the benefit of priority of Chinese Patent Application No. 202310348728.2, entitled "ROAD INTELLIGENT COMPACTION INDEX, AND MEASUREMENT AND CALCULATION METHOD AND SYSTEM", filed to National Intellectual Property Administration on Apr. 4, 2023, the entire contents of which are incorporated herein by reference.

TECHNICAL FIELD

The disclosure relates to the technical field of intelligent compaction for road engineering, and in particular to a road intelligent compaction index, and a measurement and calculation method and system.

BACKGROUND

Compaction is an important part of a road construction process. The compaction of the road in accordance with target requirements can effectively improve the strength, stiffness, and stability of the road. Traditional road compaction methods and compaction quality testing methods have made important contributions to China's infrastructure construction in the past half century. However, the traditional road compaction methods and the compaction quality testing methods also have the problems of destructiveness, lag in testing, and limitations in testing areas. An intelligent compaction technology solves the problems of the traditional compaction methods and compaction quality testing methods to a large extent.

The intelligent compaction technology is an emerging road compaction technology in foreign countries, and has been developed relatively rapidly in China in recent years. The core of the intelligent compaction technology mainly includes two aspects, namely a continuous compaction quality testing technology and a real-time compaction process control technology, the former is mainly achieved by compaction quality testing related sensors, and the latter mainly relies on intelligent compaction control system software based on adaptive and self-learning technology training, while supplemented by an unmanned driving technology, so as to achieve the standardization and unification of intelligent compaction construction.

However, as the emerging road construction technology, the intelligent compaction technology still has some problems in the following aspects. (1) When a road intelligent compaction index is used in a test, an obtained acceleration signal for calculating the road intelligent compaction index is mostly a non-integral period signal, and if the non-integral period acceleration signal is used directly, the problem of inaccurate calculation of a harmonic ratio index is caused. (2) At present, the most widely used harmonic ratio road intelligent compaction index does not consider the existence of a higher harmonic, and also lacks a precondition for the use, which also leads to inaccurate use of the road intelligent compaction index.

Therefore, the disclosure aims to provide a more accurate control index based on the current road intelligent compaction index, and provide a corresponding periodic truncation method for the acceleration signal.

SUMMARY

One aspect of an embodiment of the present disclosure provides a method for detecting road intelligent compaction, comprising the following steps:

S1: mounting an acceleration sensing apparatus on a vibration wheel of a vibratory roller;

S2: turning on the acceleration sensing apparatus, and enabling the vibratory roller to activate a vibration mode to start construction;

S3: performing periodic truncation processing on an acceleration signal obtained by the acceleration sensing apparatus, wherein the periodic truncation processing comprises: truncating the acceleration signal for one second each time to obtain a truncated signal, performing noise reduction processing on the truncated signal to obtain a new signal; then eliminating a plurality of unstable points at the beginning of the new signal, finding a target point with a phase similar to a first unstable point within one period at the end of the new signal, and removing the target point and subsequent signals to achieve the periodic truncation of the acceleration signal, the noise reduction processing comprises: performing Fourier transform on the truncated signal to obtain a transformed signal, zeroing components of the transformed signal above 4 times fundamental frequency, and then restoring the transformed signal through Fourier inversion to obtain the new signal;

S4: calculating the road intelligent compaction index by using the acceleration signal after the periodic truncation processing, wherein a calculation formula of the road intelligent compaction index is:

$$\begin{cases} ICCV = C \dfrac{\sqrt{A_{2\Omega}^2 + A_{3\Omega}^2 + A_{4\Omega}^2 + A_{5\Omega}^2}}{A_\Omega} \\ JCC \ne 0 \end{cases}$$

where ICCV is the road intelligent compaction index; C is a constant, which is 300; $A_\Omega$ is an amplitude corresponding to a fundamental wave in an frequency domain signal corresponding to the acceleration signal; $A_{2\Omega}$ is an amplitude corresponding to a second harmonic in the frequency domain signal corresponding to the acceleration signal; $A_{3\Omega}$ is an amplitude corresponding to a third harmonic in the frequency domain signal corresponding to the acceleration signal; $A_{4\Omega}$ is an amplitude corresponding to a fourth harmonic in the frequency domain signal corresponding to the acceleration signal; $A_{5\Omega}$ is an amplitude corresponding to a fifth harmonic in the frequency domain signal corresponding to the acceleration signal; and JCC is a machine-material decoupling control index, JCC is a precondition for the use of the road intelligent compaction index, and a specific formula is as follows:

$$JCC = C \dfrac{A_{0.5\Omega}}{A_\Omega};$$

where $A_{0.5\Omega}$ is an amplitude corresponding to a half harmonic in the acceleration frequency domain signal;

S5: performing effective signal screening on the road intelligent compaction index; and S6: analyzing the road intelligent compaction index to obtain a field or indoor experimental result of intelligent compaction.

In some embodiments, a specific method for performing effective signal screening in S5 comprises: eliminating the road intelligent compaction index with the machine-material decoupling control index of 0, and leaving the screened the road intelligent compaction index.

In some embodiments, the range of the acceleration sensing apparatus is greater than 5 times the amplitude of the excitation force of the vibratory roller and less than 10 times the amplitude of the excitation force of the vibratory roller, and the collection frequency of the acceleration sensing apparatus is greater than 500 Hz and less than 2000 Hz.

In some embodiments, S1 further comprises: mounting a temperature sensing apparatus and a water content detection apparatus on the vibration wheel of the vibratory roller, wherein the temperature sensing apparatus is configured to obtain a construction temperature of an asphalt surface layer, and the water content detection apparatus is configured to detect a water content of subgrade soil.

In some embodiments, a method for analyzing the field or indoor experimental result in S6 comprises: first, setting a qualification threshold of the road intelligent compaction index ICCV as A, when an the road intelligent compaction index ICCV value >A, considering that the compaction quality of intelligent compaction meets the requirements, otherwise considering that the compaction quality does not meet the requirements; and second, introducing a statistical method to perform compaction uniformity evaluation, through the introduction of a univariate statistical 3σ criterion, when the road intelligent compaction index ICCV value is within the range of (μ−3σ, μ+3σ), considering that the compaction quality is uniform, otherwise considering that the compaction quality is non-uniform.

Another aspect of an embodiment of the present disclosure provides a system for detecting road intelligent compaction, comprising a signal truncation module, an index calculation module, and an index screening and analysis module; and the signal truncation module is configured to perform periodic truncation processing on an acceleration signal obtained by an acceleration sensing apparatus, wherein the periodic truncation processing comprises: truncating the acceleration signal for one second each time, to obtain a truncated signal, performing noise reduction processing on the truncated signal to obtain a new signal; then eliminating a plurality of unstable points at the beginning of the new signal, finding a target point with a phase similar to a first unstable point within one period at the end of the new signal, and removing the target point and subsequent signals to achieve the periodic truncation of the acceleration signal, the noise reduction processing comprises: performing Fourier transform on the truncated signal to obtain a transformed signal, zeroing components of the transformed signal above 4 times fundamental frequency, and then restoring the transformed signal through Fourier inversion to obtain the new signal; and the index calculation module is configured to calculate an road intelligent compaction index by using the acceleration signal after the periodic truncation processing, wherein a calculation formula of the road intelligent compaction index is:

$$\begin{cases} ICCV = C \dfrac{\sqrt{A_{2\Omega}^2 + A_{3\Omega}^2 + A_{4\Omega}^2 + A_{5\Omega}^2}}{A_\Omega} \\ JCC \ne 0 \end{cases}$$

where ICCV is the road intelligent compaction index; C is a constant, which is 300; $A_\Omega$ is an amplitude corresponding to a fundamental wave in an frequency domain signal corresponding to the acceleration signal; $A_{2\Omega}$ is an amplitude corresponding to a second harmonic in the frequency domain signal corresponding to the acceleration signal; $A_{3\Omega}$ is an amplitude corresponding to a third harmonic in the frequency domain signal corresponding to the acceleration signal; $A_{4\Omega}$ is an amplitude corresponding to a fourth harmonic in the frequency domain signal corresponding to the acceleration signal; $A_{5\Omega}$ is an amplitude corresponding to a fifth harmonic in the frequency domain signal corresponding to the acceleration signal; and JCC is a machine-material decoupling control index, JCC is a precondition for the use of the road intelligent compaction index, and a specific formula is as follows:

$$JCC = C \dfrac{A_{0.5\Omega}}{A_\Omega};$$

where $A_{0.5\Omega}$ is an amplitude corresponding to a half harmonic in the acceleration frequency domain signal; and the index screening and analysis module is configured to perform effective signal screening on the road intelligent compaction index and analyze the road intelligent compaction index to obtain a field or indoor experimental result of intelligent compaction.

BRIEF DESCRIPTION OF THE DRAWINGS

The disclosure will be described by examples and with reference to the accompanying drawings.

DETAILED DESCRIPTION OF THE EMBODIMENTS

Figure 1:
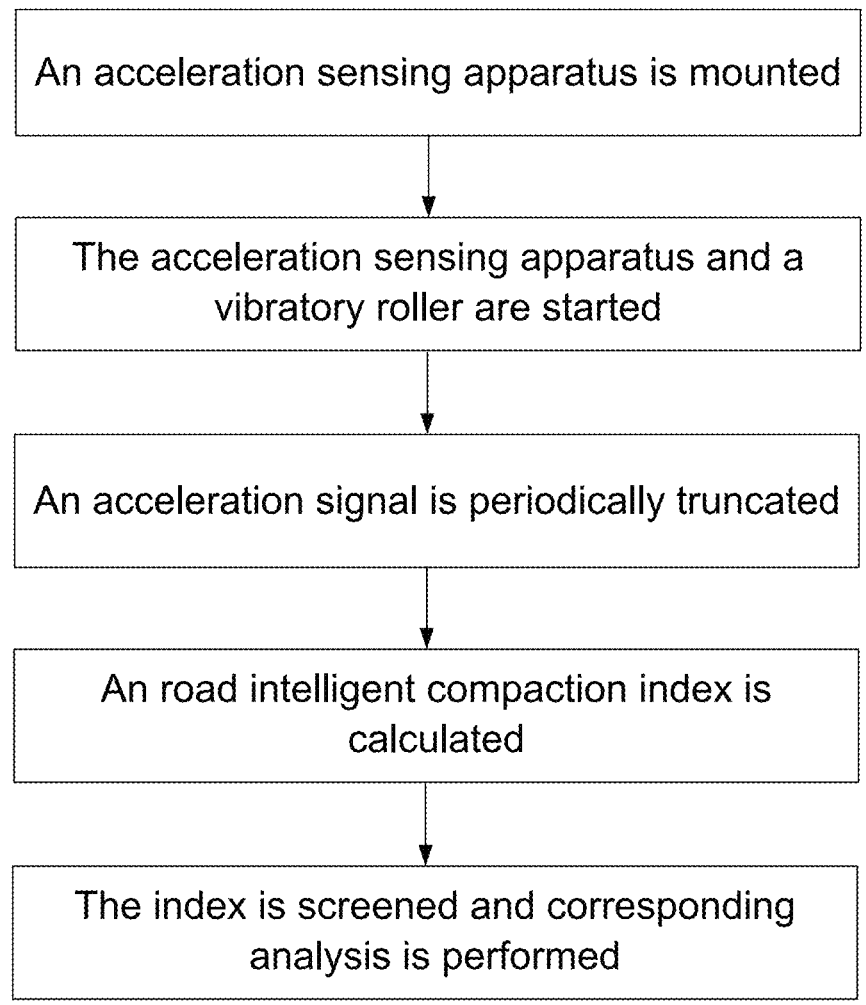
FIG. 1 is a flowchart of a measurement and calculation method of a road intelligent compaction index involved in Embodiment 1.

In order to make the objects, technical solutions and advantages of the embodiments of the disclosure clearer, the technical solutions in the embodiments of the disclosure will be clearly and completely described in conjunction with the accompanying drawings in the embodiments of the disclosure. It is apparent that the described embodiments are only a part of the embodiments of the disclosure, and not all of them. Therefore, the following detailed description of the embodiments of the disclosure provided in the accompanying drawings is not intended to limit the scope of the claimed disclosure, but only represents the selected embodiments of the disclosure. All other embodiments obtained by those skilled in the art based on the embodiments of the disclosure without creative efforts are within the scope of protection of the disclosure.

Embodiment 1: the specific embodiment of the disclosure is elaborated in detail below with reference to FIG. 1, FIG. 3 to FIG. 5.

A road intelligent compaction index is provided. A calculation formula of the road intelligent compaction index is:

$$\begin{cases} ICCV = C \dfrac{\sqrt{A_{2\Omega}^2 + A_{3\Omega}^2 + A_{4\Omega}^2 + A_{5\Omega}^2}}{A_\Omega} \\ JCC \neq 0 \end{cases}$$

where ICCV is the road intelligent compaction index; C is a constant, which is 300; $A_\Omega$ is an amplitude corresponding to a fundamental wave in an frequency domain signal corresponding to the acceleration signal; $A_{2\Omega}$ is an amplitude corresponding to a second harmonic in the frequency domain signal corresponding to the acceleration signal; $A_{3\Omega}$ is an amplitude corresponding to a third harmonic in the frequency domain signal corresponding to the acceleration signal; $A_{4\Omega}$ is an amplitude corresponding to a fourth harmonic in the frequency domain signal corresponding to the acceleration signal; $A_{5\Omega}$ is an amplitude corresponding to a fifth harmonic in the frequency domain signal corresponding to the acceleration signal; and JCC is a machine-material decoupling control index, JCC is a precondition for the use of the road intelligent compaction index, and a specific formula is as follows:

$$JCC = C \dfrac{A_{0.5\Omega}}{A_\Omega};$$

where $A_{0.5\Omega}$ is an amplitude corresponding to a half harmonic in the acceleration frequency domain signal.

A measurement and calculation method for a road intelligent compaction index includes the following steps.

At S1, an acceleration sensing apparatus is mounted on a vibration wheel of a vibratory roller. The acceleration sensing apparatus is mounted on a central axis of a steel wheel where the roller vibrates, at the same time, a mounting direction of the single-axis acceleration sensing apparatus is perpendicular to the ground, so as to obtain a vibration acceleration signal of the vibration wheel of the roller in a vertical direction. The range of the acceleration sensing apparatus is 7 times the amplitude of the excitation force of the vibratory roller, and the collection frequency is 1000 Hz. In addition, a temperature sensing apparatus is additionally arranged to obtain a construction temperature of an asphalt surface layer.

At S2, the acceleration sensing apparatus is turned on, and the vibratory roller activates a vibration mode to start construction.

At S3, periodic truncation processing is performed on an acceleration signal obtained by the acceleration sensing apparatus.

A specific method for periodic truncation processing includes the following operation.

Figure 3:
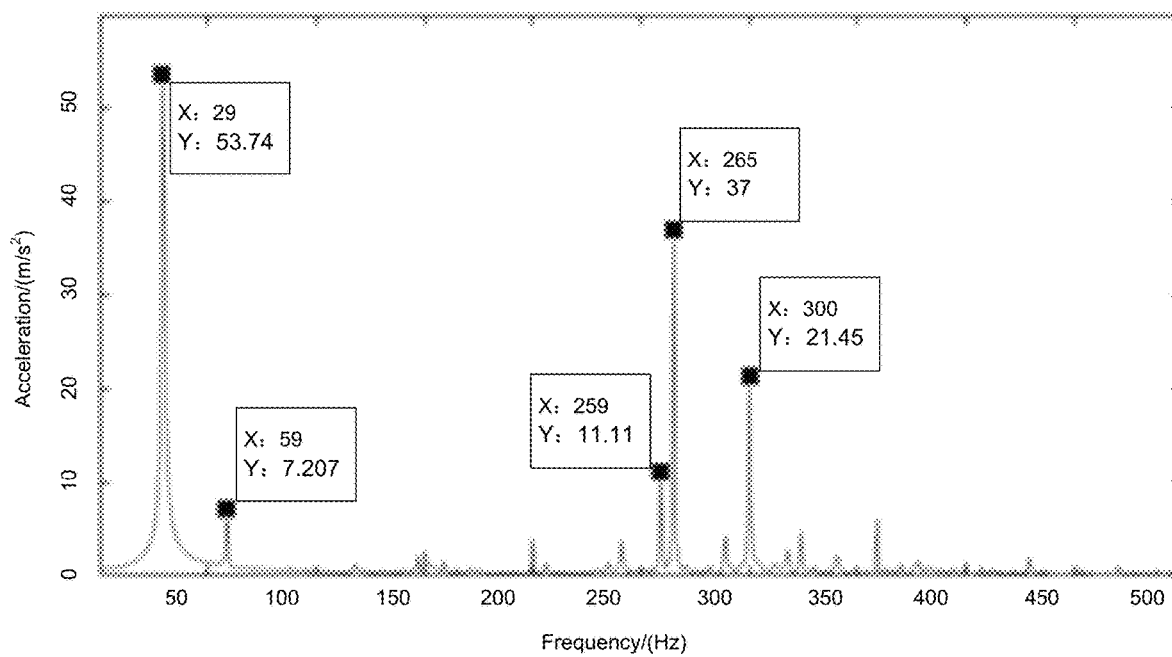
FIG. 3 is a Fourier transform spectrum diagram of an original vibration signal involved in Embodiment 1.
Figure 4:
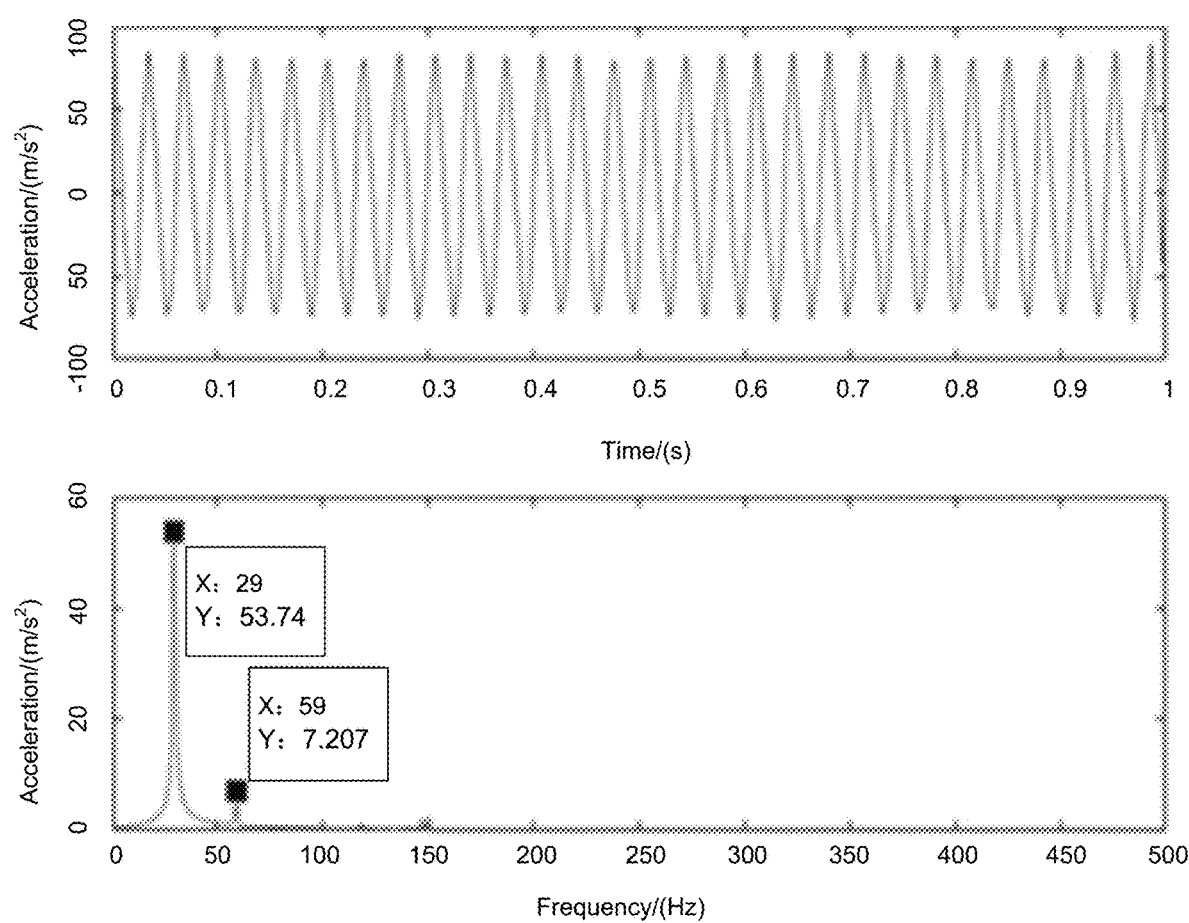
FIG. 4 is time domain and spectrum diagrams of a noise reduction signal involved in Embodiment 1.
Figure 5:
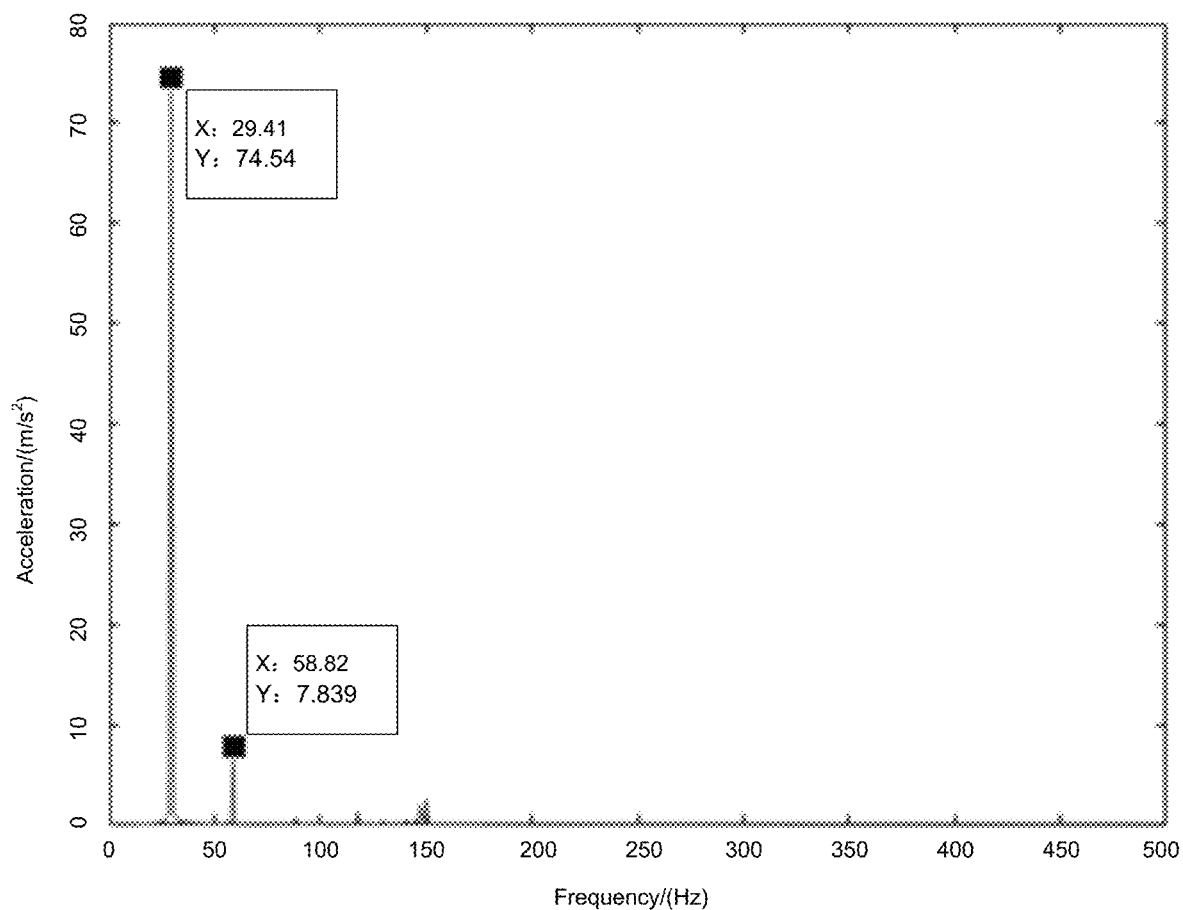
FIG. 5 is a spectrum diagram after periodic truncation of a signal involved in Embodiment 1.

The acceleration signal is truncated for one second each time to obtain a truncated signal, noise reduction processing is performed on the truncated signal. Fourier transform is performed on the truncated signal (FIG. 3). It can be seen from FIG. 3 that: after Fourier transform, the truncated signal has not only peaks corresponding to basic frequency and the second harmonic, but also peaks corresponding to other higher harmonics. According to the calculation method for the road intelligent compaction index provided by the disclosure, the peaks above 4 times the fundamental frequency are removed. After zeroing the components above 4 times the fundamental frequency, a new signal after noise reduction is obtained by restoring through Fourier inversion (FIG. 4). It can be seen from FIG. 4 that: the peak corresponding to more than 4 times the fundamental frequency does not exist, and only the peak corresponding to 4 times the fundamental frequency is left. Then, a plurality of unstable points of half a period at the beginning of the new signal are eliminated, a target point with a phase similar to the first unstable point within one period at the end of the new signal after noise reduction is found, and the target point and subsequent signals are removed to achieve periodic truncation of the acceleration signal (FIG. 5). It can be seen from FIG. 5 that: after the periodic truncation, the basic frequency of the signal does not change, but the peak corresponding to the fundamental frequency increases, and the peak corresponding to the double fundamental frequency also increases, so that the subsequent calculated road intelligent compaction index value decreases.

At S4, the road intelligent compaction index is calculated by using the acceleration signal after periodic truncation processing.

At S5, effective signal screening is performed on the road intelligent compaction index. The road intelligent compaction index ICCV with the JCC index of 0 is eliminated, and the screened road intelligent compaction index ICCV is left.

At S6, the road intelligent compaction index is analyzed to obtain a field or indoor experimental result of intelligent compaction. An analysis process includes that: a qualification threshold of ICCV is set as A, which is preferably 100, when an ICCV value >100, it is considered that the compaction quality meets the requirements, otherwise it is considered that the compaction quality does not meet the requirements.

According to the road intelligent compaction index of the disclosure, on the one hand, based on the analysis of the acceleration signal obtained in the field or indoor experiment, it was found that there are significant peaks corresponding to the integer harmonics in the quintuple harmonics of the acceleration frequency domain signal, so that the quintuple harmonics are considered in the road intelligent compaction index.

On the other hand, the judging criteria JCC for decoupling of the roller and the compacted material is introduced, and the JCC index is taken as the precondition for the use of the ICCV index. Only when JCC≠0, it indicates that there is no decoupling between the roller and the compacted material, that is, the roller and the compacted material are always in contact, at this time, the ICCV index has the significance of use.

In summary, the road intelligent compacting index of the disclosure has higher stability and less variability than the existing harmonic ratio intelligent compaction index.

Figure 2:
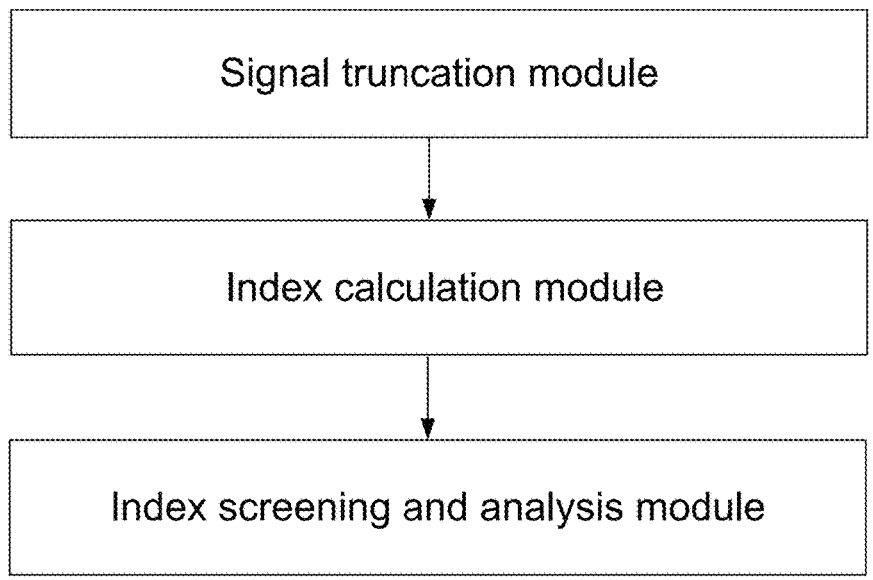
FIG. 2 is a schematic structural diagram of a measurement and calculation system of a road intelligent compaction index involved in Embodiment 2.

Embodiment 2: referring to the FIG. 2, a measurement and calculation system for a road intelligent compaction index is provided, it should be understood that the system corresponds to Embodiment 1 and is able to execute the various steps involved in the method embodiment in FIG. 1. the specific functions of the system may refer to the descriptions above, and the detailed description is appropriately omitted here to avoid repetition. As shown in FIG. 2, a measurement and calculation system for a road intelligent compaction index includes a signal truncation module, an index calculation module, and an index screening and analysis module. The signal truncation module is configured to perform periodic truncation processing on an acceleration signal obtained by an acceleration sensing apparatus, the index calculation module is configured to calculate an road intelligent compaction index by using the acceleration signal after periodic truncation processing, and the index screening and analysis module is configured to perform effective signal screening on the calculated road intelligent compaction index, and analyze a field or indoor experimental result of intelligent compaction based on the screened ICCV index. The analysis method includes that: a statistical method is introduced to perform compaction uniformity evaluation, through the introduction of a univariate statistical 3σ criterion, when the ICCV value is within the range of (μ−3σ, μ+3σ), it is considered that the compaction is uniform, otherwise it is considered that the compaction quality is non-uniform.

The above embodiments are merely illustrative of several implementation modes of the disclosure with specific and detailed description, and are not to be construed as limiting the scope of protection of the disclosure. It is to be noted that a number of variations and modifications may be made by those of ordinary skill in the art without departing from the conception of the disclosure, and all fall within the scope of protection of the disclosure.

What is claimed is:

1. A method for detecting road intelligent compaction, comprising the following steps:
   S1: mounting an acceleration sensing apparatus on a vibration wheel of a vibratory roller;
   S2: turning on the acceleration sensing apparatus, and enabling the vibratory roller to activate a vibration mode to start construction;
   S3: performing periodic truncation processing on an acceleration signal obtained by the acceleration sensing apparatus, wherein the periodic truncation processing comprises: truncating the acceleration signal for one second each time to obtain a truncated signal, performing noise reduction processing on the truncated signal to obtain a new signal; then eliminating a plurality of unstable points at the beginning of the new signal, finding a target point with a phase similar to a first unstable point within one period at the end of the new signal, and removing the target point and subsequent signals to achieve the periodic truncation of the acceleration signal, the noise reduction processing comprises: performing Fourier transform on the truncated signal to obtain a transformed signal, zeroing components of the transformed signal above 4 times fundamental frequency, and then restoring the transformed signal through Fourier inversion to obtain the new signal;
   S4: calculating the road intelligent compaction index by using the acceleration signal after the periodic truncation processing, wherein a calculation formula of the road intelligent compaction index is:

$$\begin{cases} ICCV = C\dfrac{\sqrt{A_{2\Omega}^2 + A_{3\Omega}^2 + A_{4\Omega}^2 + A_{5\Omega}^2}}{A_\Omega} \\ JCC \neq 0 \end{cases};$$

where ICCV is the road intelligent compaction index; C is a constant, which is 300; $A_\Omega$ is an amplitude corresponding to a fundamental wave in an frequency domain signal corresponding to the acceleration signal; $A_{2\Omega}$ is an amplitude corresponding to a second harmonic in the frequency domain signal corresponding to the acceleration signal; $A_{3\Omega}$ is an amplitude corresponding to a third harmonic in the frequency domain signal corresponding to the acceleration signal; $A_{4\Omega}$ is an amplitude corresponding to a fourth harmonic in the frequency domain signal corresponding to the acceleration signal; $A_{5\Omega}$ is an amplitude corresponding to a fifth harmonic in the frequency domain signal corresponding to the acceleration signal; and JCC is a machine-material decoupling control index, JCC is a precondition for the use of the road intelligent compaction index, and a specific formula is as follows:

$$JCC = C\dfrac{A_{0.5\Omega}}{A_\Omega};$$

where $A_{0.5\Omega}$ is an amplitude corresponding to a half harmonic in the acceleration frequency domain signal;
   S5: performing effective signal screening on the road intelligent compaction index; and
   S6: analyzing the road intelligent compaction index to obtain a field or indoor experimental result of intelligent compaction.

2. The method for the road intelligent compaction detection according to claim 1, wherein a specific method for performing effective signal screening in S5 comprises: eliminating the road intelligent compaction index with the machine-material decoupling control index of 0, and leaving the screened the road intelligent compaction index.

3. The method for the road intelligent compaction detection according to claim 1, wherein the range of the acceleration sensing apparatus is greater than 5 times the amplitude of the excitation force of the vibratory roller and less than 10 times the amplitude of the excitation force of the vibratory roller, and the collection frequency of the acceleration sensing apparatus is greater than 500 Hz and less than 2000 Hz.

4. The method for the road intelligent compaction detection according to claim 1, wherein S1 further comprises: mounting a temperature sensing apparatus and a water content detection apparatus on the vibration wheel of the vibratory roller, wherein the temperature sensing apparatus is configured to obtain a construction temperature of an asphalt surface layer, and the water content detection apparatus is configured to detect a water content of subgrade soil.

5. The method for the road intelligent compaction detection according to claim 1, wherein a method for analyzing the field or indoor experimental result in S6 comprises:
   first, setting a qualification threshold of the road intelligent compaction index as A, when the road intelligent compaction index>A, considering that the compaction quality of intelligent compaction meets the requirements, otherwise considering that the compaction quality does not meet the requirements; and
   second, introducing a statistical method to perform compaction uniformity evaluation, through the introduction of a univariate statistical 3σ criterion, when the road intelligent compaction index is within the range of (μ−3σ, μ+3σ), considering that the compaction quality is uniform, otherwise considering that the compaction quality is non-uniform.

6. A system for detecting road intelligent compaction, comprising a signal truncation module, an index calculation module, and an index screening and analysis module; and the signal truncation module is configured to perform periodic truncation processing on an acceleration signal obtained by an acceleration sensing apparatus, wherein the periodic truncation processing comprises: truncating the acceleration signal for one second each time, to obtain a truncated signal, performing noise reduction processing on the truncated signal to obtain a new signal; then eliminating a plurality of unstable points at the beginning of the new signal, finding a target point with a phase similar to a first unstable point within one period at the end of the new signal, and removing the target point and subsequent signals to achieve the periodic truncation of the acceleration signal, the noise reduction processing comprises: performing Fourier transform on the truncated signal to obtain a transformed signal, zeroing components of the transformed signal above 4 times fundamental frequency, and then restoring the transformed signal through Fourier inversion to obtain the new signal; and the index calculation module is configured to calculate a road intelligent compaction index by using the acceleration signal after the periodic truncation processing, wherein a calculation formula of the road intelligent compaction index is:

$$\begin{cases} ICCV = C \dfrac{\sqrt{A_{2\Omega}^2 + A_{3\Omega}^2 + A_{4\Omega}^2 + A_{5\Omega}^2}}{A_\Omega} \\ JCC \ne 0 \end{cases};$$

where ICCV is the road intelligent compaction index; C is a constant, which is 300; $A_\Omega$ is an amplitude corresponding to a fundamental wave in an frequency domain signal corresponding to the acceleration signal; $A_{2\Omega}$ is an amplitude corresponding to a second harmonic in the frequency domain signal corresponding to the acceleration signal; $A_{3\Omega}$ is an amplitude corresponding to a third harmonic in the frequency domain signal corresponding to the acceleration signal; $A_{4\Omega}$ is an amplitude corresponding to a fourth harmonic in the frequency domain signal corresponding to the acceleration signal; Asn is an amplitude corresponding to a fifth harmonic in the frequency domain signal corresponding to the acceleration signal; and JCC is a machine-material decoupling control index, JCC is a precondition for the use of the road intelligent compaction index, and a specific formula is as follows:

$$JCC = C \dfrac{A_{0.5\Omega}}{A_\Omega};$$

where $A_{0.5\Omega}$ is an amplitude corresponding to a half harmonic in the acceleration frequency domain signal; and the index screening and analysis module is configured to perform effective signal screening on the road intelligent compaction index and analyze the road intelligent compaction index to obtain a field or indoor experimental result of intelligent compaction.

* * * * *